April 26, 1949.　　　　　　E. T. DENTON　　　　　　2,468,176
APPARATUS FOR SUBJECTING MATERIAL TO THE
ACTION OF SPLIT ELECTRICAL DISCHARGES
Filed Aug. 6, 1943　　　　　　　　　　　　　　　2 Sheets-Sheet 2
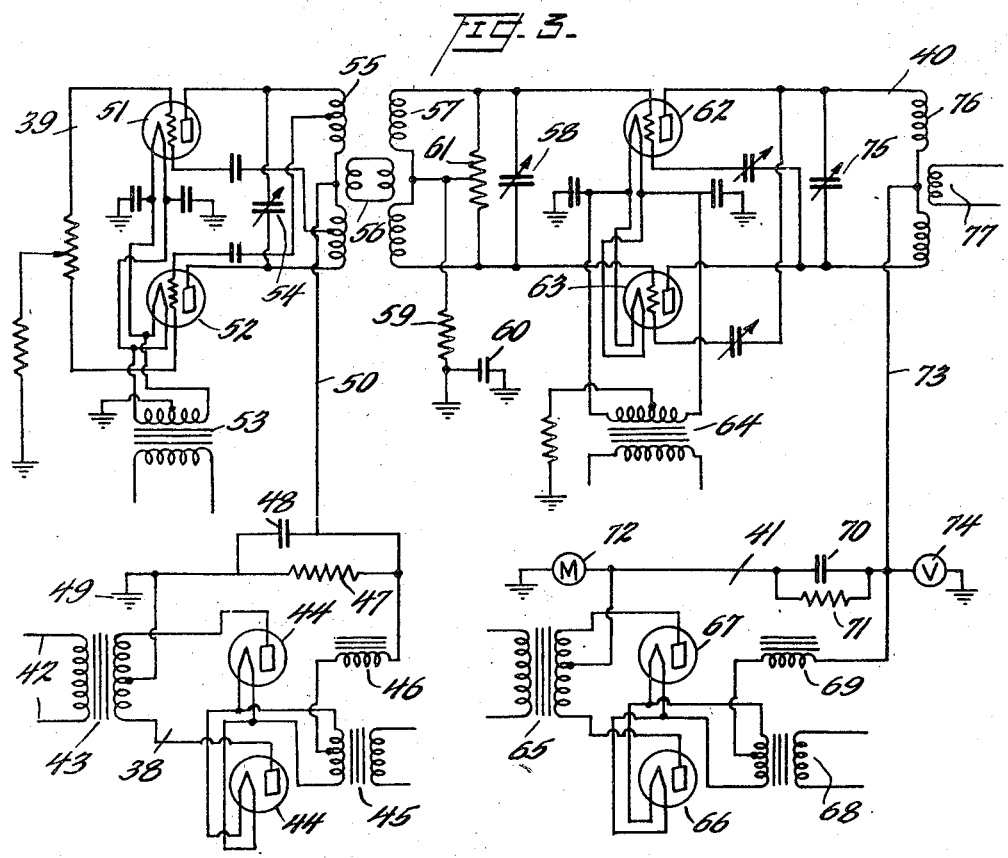
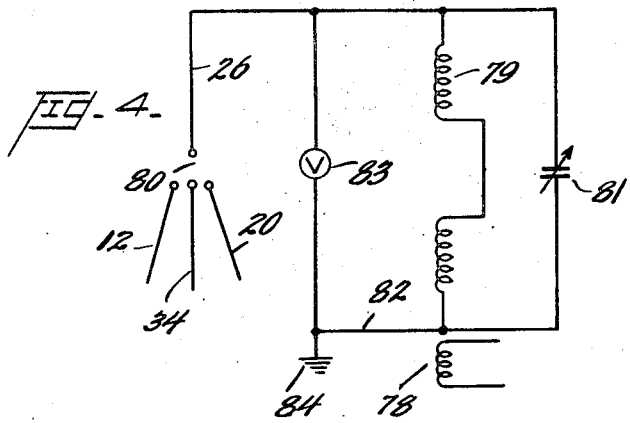
Inventor
Earl T. Denton,
By Ivan P. Tashof,
Attorney Patented Apr. 26, 1949

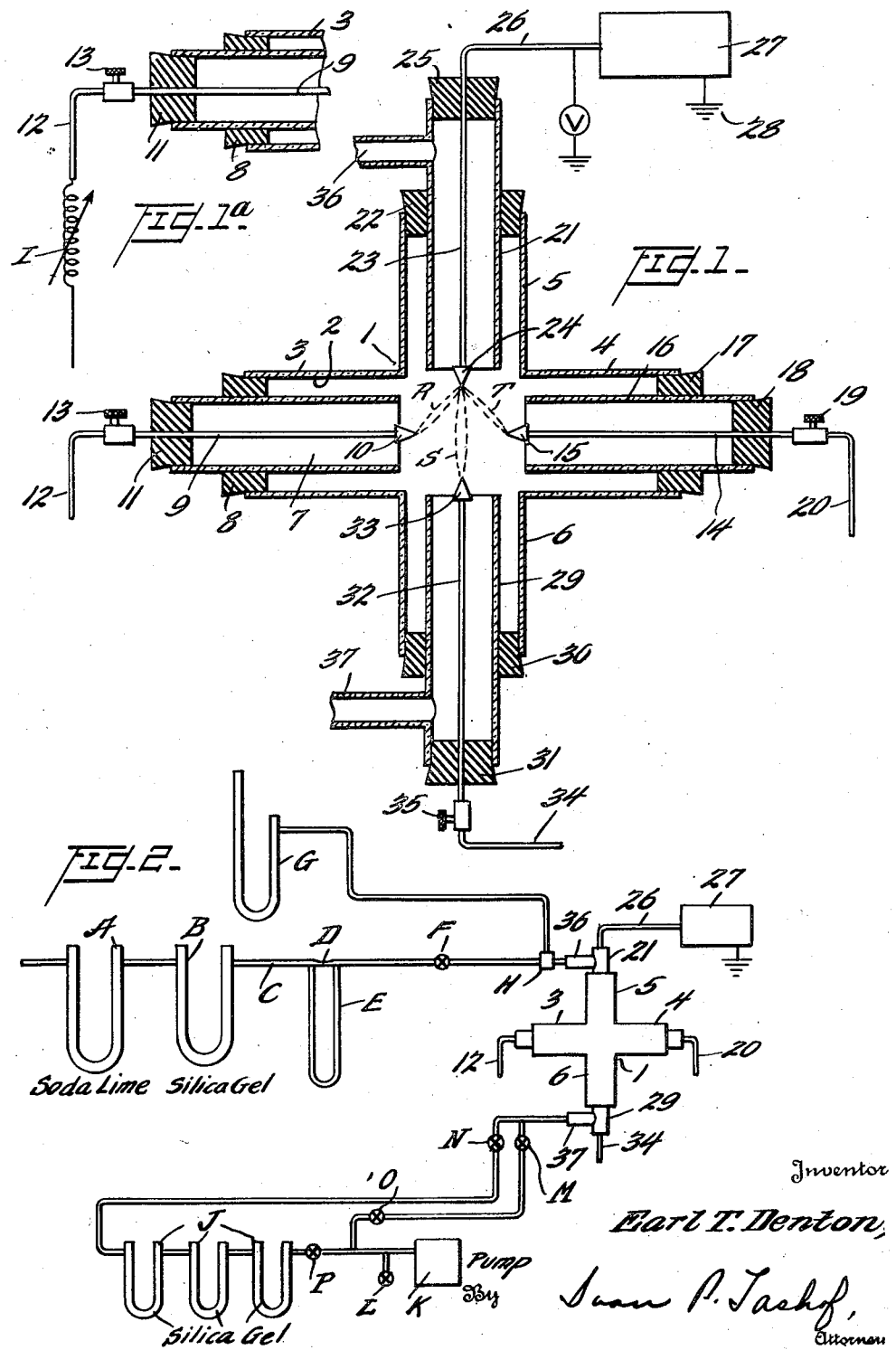

2,468,176

UNITED STATES PATENT OFFICE 2,468,176

APPARATUS FOR SUBJECTING MATERIAL TO THE ACTION OF SPLIT ELECTRICAL DISCHARGES

Earl T. Denton, Butler, Pa., assignor, by mesne assignments, to Koppers Company, Inc., a corporation of Delaware Application August 6, 1943, Serial No. 497,676

5 Claims. (Cl. 204—327)

This invention relates to a method and apparatus wherein gaseous material is subjected to the action of a split or divided electrical discharge.

The principal object of the present invention is to provide a method and apparatus whereby electrical energy is transferred from a source of high frequency current to a reactor discharge zone with relatively little loss of electrical energy. More specifically, the present invention is directed to the step of increasing, in an apparatus of the character herein set forth, the electrical energy transfer efficiency. This is effected by carrying out the chemical reactions in the reactor in the presence of split discharges, this term being used in the sense that it covers discharges which are totally split or which are merely split for a portion of the discharge volume, usually closely adjacent to the cooperating electrodes which generate the discharge.

The present invention in one form is directed to an electrochemical apparatus for effecting electrochemical transformation of material. The apparatus comprises the combination of a source of cyclic electrical energy and a reactor, said reactor comprising inlet and outlet members, a high potential reactor electrode connected to said source of cyclic electrical energy, and a plurality of cooperating low potential reactor electrodes, each thereof being in operative connection with a separate antenna, each of said antennas being in circuit with said source of cyclic electrical energy. Each antenna is conditioned to cause the initiation of a plurality of discharges in said reactor on the passage of said cyclic electrical energy through the high potential electrode, said discharges being preferably luminous discharges.

The electrical characteristics of the electrical circuit of which the antennas are a component part must be such that split discharges are produced when cyclic electrical energy is applied to the high potential or hot electrode of the reactor. In one form of the invention, the antennas are coupled to inductances, said inductances being preferably of a character to provide what may be termed a relatively "fat" luminous discharge. Other equivalent means may be used to condition the antennas so that the circuit of which said antennas are a part will cause the initiation of a plurality of discharges in the reactor on the passage of cyclic electrical energy through the reactor hot electrode. The reactor shown in Fig. 1 of the drawing has antennas which are properly conditioned by antenna wires alone, no inductances being used.

In the more specific form of the invention, an apparatus is provided for effecting electrochemical transformation of gaseous material with transfer of electrical energy from a source of cyclic electrical energy to the reactor electrodes, with relatively low transfer loss, said apparatus comprising a reactor comprising inlet and outlet members, a high potential electrode, and a plurality of low potential electrodes cooperating therewith, said reactor being combined with a generator unit including a tank circuit connecting the generator unit to the reactor, said generator unit functioning as a source of electrical energy. The tank circuit includes a plurality of antennas, each respectively in operative connection with each of said cooperating electrodes, said tank circuit being tuned to cause the initiation of a plurality of discharges in said reactor on the passage of electrcal energy through said electrode.

In the preferred form of the invention, the reactor of the electrochemical apparatus is provided with a hot electrode which is incapable of oxidation at the temperature present in the reactor. Desirably, it has a melting point of the order of that possessed by tantalum, whereby oxidation of the electrode is inhibited at the temperature present in the reactor.

It is within the province of the present invention to use high frequency energy in currents varying from about 10,000 cycles to 300,000 mc. although low frequency energy as hereafter more particularly set forth may be used. These figures correspond in wave length from 30,000 meters to 1 mm. or less. The invention may be carried out when using a high frequency current varying from about 250,000 cycles to 300,000 mc. or over; or using 500,000 cycles to 300,000 mc. or over. As a practical matter, the invention finds its greatest field of usefulness when the electrochemical transformation of the materials is effected using high frequency energy of the order of radio frequency or radar frequency. However, as pointed out, the invention may be used in connection with much lower or higher frequencies.

The invention will be described in connection with the accompanying drawings, in which Fig. 1 sets forth a reactor in which a plurality of electrodes is provided, one of which is a so-called "hot electrode" directly connected in the tank circuit of the generator; and the remaining electrodes function as ground electrodes;

Fig. 1ª is a detail of a modified form of antenna which may be substituted for the antenna shown in Fig. 1;

Fig. 2 is a diagrammatic representation of an apparatus for drying air prior to its introduction into the reactor and for absorbing the nitric oxide content of the exit reaction gases;

Fig. 3 further sets forth the hook-up of the high frequency generator used in providing the high frequency energy supplied to the tank circuit connecting the generator to the reactor; and Fig. 4 sets forth the tank circuit used in conveying the electrical energy from the generator to the reactor.

Referring to Fig. 1, the reactor unit comprises a reactor vessel 1 having an interior wall 2, said reactor being made of a non-conducting or insulating medium, such as a ceramic material, including glass, and preferably a high melting point glass, as exemplified by borosilicate glass.

The reactor 1 comprises horizontally extending members or legs 3 and 4, and vertically extending members or legs 5 and 6. Positioned within the reactor leg 3 is a sheath member 7 made of glass, said sheath member being mounted in an insulating closure 8. Projecting through the sheath 7 is an electrode 9 carrying a pointed electrode terminal or tip 10. The electrode 9 is mounted in an insulating closure member 11, said electrode 9 being connected to an antenna 12 in any suitable manner, as for example, by set screw 13. Positioned within the leg 4 is a similar electrode 14, having an electrode tip or terminal 15. The electrode 14 is positioned within a sheath member 16, the latter passing through a closure member 17, said sheath member being closed by the insulating member 18 through which the electrode 14 passes. The electrode 14 is connected to the antenna 20 by any suitable means, as, for example, by set screw 19. Positioned within the vertically extending leg member 5 is a glass sheath 21. The leg member 5 is closed by means of the closure 22. The electrode 23 provided with an electrode tip or terminal 24 passes through the closure member 22 and through the sheath closure member 25, which functions to close the exterior end of the sheath 21. The electrode 23 is connected to a generator 27 by means of a tank circuit lead 26, as shown in Figs. 1 and 4. The generator, which is identified as an entity by the numeral 27 in Fig. 1, is grounded via the tank circuit at 28, said ground being also shown at 84 in Fig. 4. The hook-up of the generator 27 is shown in Fig. 3, the generator circuit being coupled with the tank circuit set forth in Fig. 4.

Positioned within the leg member 6, which is preferably diametrically opposite the leg 5, is a sheath member 29, which passes through the leg closure member 30, said sheath member being provided with an exterior end insulating closure member 31. Passing through the leg member 6 and mounted in the closure members 30 and 31 is an electrode 32, provided with an electrode terminal or tip 33. The electrode 32 is connected to the antenna 34 in any suitable manner, as by means of a set screw 35. The leg 5 is provided with an inlet conduit 36 and leg 6 with an outlet conduit 37.

The electrode terminals 10, 15, 24 and 33 are preferably pointed, as this increases the chemical yield of product per kilowatt hour. However, it is within the province of the present invention to use buttons, nodules, globules, or to have the electrode terminals in any other shape hitherto used in the treatment or electrochemical transformation of chemical products.

When the electrode terminals are in the shape of sharp-pointed members, the sheath members 7, 16, 21 and 29 may be omitted, but it is highly desirable to retain them in order to force the flow of the gaseous medium being subjected to the action of the electric discharge in and around the electrode tips. Further, it is desired to point out that the sheath members function, to a large extent, to protect the outer vessel from the effect of heat, which may be produced during the course of the reaction in the reactor. It is preferable that the electrode terminals 10, 15, 24 and 33 project beyond the interior ends of the sheath members in order to avoid undue heating of sheath tubes, thus avoiding inducing generation of sodium and other undesirable ions which tend to generate side reactions.

The diameter of each of the reactor legs is approximately 32 mm. and the diameter of the sheath members is approximately 23 mm. The overall length of the horizontal members, from the exterior end of the leg 3 to the exterior end of the leg 4, is about 10 inches, and the vertical members have a like overall length. These dimensions are set forth in an illustrative sense and are not to be taken by way of limitation.

While the reactor herein set forth may be used to effect the electrochemical transformation of various materials, the operation thereof will be set forth in connection with the production of nitric oxide from atmospheric air.

The atmospheric air to be treated is dried in an apparatus of the character set forth in Fig. 2, and in the manner hereinafter described, and then is introduced through the inlet member 36 into the sheath member 21, and then passes through the sheath member and through the plurality of discharges present in the reactor. The reaction products pass around the electrode terminal 33, through the sheath member 29, and leave the reactor by means of the exit conduit 37.

The air is dried prior to its introduction into the reactor vessel 1 by passing it through the soda lime tube A, Fig. 2, then through the silica gel tube B, thence through the conduit C, through the orifice D of the differential manometer E, through the valve F, and thence to the reactor 1. At the point H is connected the mercury manometer G which measures the internal pressure of the reactor. From the reactor 1 the exit gases pass through exit conduit 37 to a series of silica gel absorber tubes J, which tubes extract the nitric oxide content of the exit gases. A vacuum is applied by means of the vacuum pump K and the amount of vacuum adjusted by means of the release valve L and the main valve F in the supply line. The soda lime functions not only to take out a portion of the moisture but also to extract from the air substantially all of the carbon dioxide. The air as delivered to the reactor 1 has a moisture content of about 5 to 8 mg. of moisture per liter. When the run is started, the valves N and P are closed and M and O are open. When operation has reached equilibrium, valves N and P are quickly opened and valves M and O closed, noting the time of doing so with a stop-watch. Upon conclusion of the run, valves M and O are opened, while N and P are closed.

The time interval during which the valves N and P are open to the absorbers and the valves M and O of the by-pass are closed is six minutes. During this period the silica gel is absorbing the nitric oxide produced by the reaction. After the run is terminated, the silica gel tubes are weighed and the increase in weight taken as the weight of nitric oxide produced in the six minutes.

In starting the apparatus, the flow of dried air is initiated through the inlet member 36, said air passing through the reactor vessel 1 at a velocity of approximately 500 cc. per minute, standard conditions, the pressure within the reactor vessel being maintained at approximately 335 mm. mercury pressure.

It is desired to point out that the antennas 12, 34 and 20 each consist of approximately 5-foot lengths of B. & S. gauge No. 18 insulated copper wire. It is desired to point out that when high frequency current is applied to the electrode 23, there is produced a split discharge, the discharge splitting to set up three distinct discharges, one discharge R being set up between electrode terminal 24 and electrode terminal 10; another discharge S being set up between the electrode terminal 24 and electrode terminal 33; and another discharge T set up between the electrode terminal 24 and the electrode terminal 15. Using nickel electrode terminals, the electrode gap for discharge R is 24 mm.; for discharge S, 23 mm.; and for discharge T, 25 mm. These specific discharge gaps are set forth by way of illustration and not by way of limitation, it being recognized that the discharge gaps may vary greatly in accordance with predetermined factors, such as the voltage under which the high frequency current is supplied, the frequency of the high frequency energy, the pressure of the gas passing through the reactor; the nature of the gas which it is desired to electrochemically react, and similar factors.

In general, while the energy supplied to the electrode 23 may be of radio frequency or radar frequency, it is within the province of the present invention to apply energy of any frequency which will result in the production of split discharges, it being pointed out that, as a practical matter, it is more difficult to tune to lower frequencies of the order of 60 to 500 cycles than it is to tune to substantially higher frequencies.

The split discharges may be produced using the apparatus set forth in Fig. 1 by supplying to the electrode 23 electrical energy of a frequency approximating 7.5 mc.—approximately 40 meters— said energy being supplied at approximately 800 volts. When electrical energy of this character is supplied to the electrode with antennas of the character herein set forth, there is produced a triply split discharge of the character hereinbefore described. The impedance, capacitance, inductance, and ohmic resistance, in other words, the electrical characteristics, of the tank circuit of which the various antennas are component parts, must be such that split discharges are produced when electrical energy of a high frequency is applied to the hot electrode 23.

The use of a plurality of antennae, each connected to a respective cold or low potential electrode, herein designated as "antenna electrodes," makes it possible to provide an apparatus including a relatively efficient split discharge. Thus, if a plurality of antennae are provided having characteristics making possible a split discharge of any character, the efficiency is increased over a single discharge device even in the simple apparatus heretofore shown by way of example, from 1% to 2% (where a simple ground connection is used) to approximately 10%.

It would be expected from the prior art knowledge that, if using a single pair of electrodes the load could be increased three fold, the transfer efficiency would then be increased similarly, i. e., from 1% to 2% to about 4% to 5%. Actually, as just previously pointed out, the present invention surprisingly increases the efficiency where a triply split arc is used to about 10%. Even greater increases are possible if the antennae are tuned or adjusted to optimum characteristics. In this case, the transfer efficiency, instead of being increased to about 10%, may be increased in the apparatus used in an illustrative sense in this application to about 30%. Without going into detail as to other means of increasing efficiency known to the prior art and not part of this present invention, by optimum balancing of load to supply, the art has been able to achieve a maximum efficiency of 50% to 55%. On the other hand, utilizing the apparatus and method of the present invention, substantially greater transfer efficiencies are obtained. But even if only the same transfer efficiencies were obtained, the apparatus and method of the present invention is highly advantageous, because in an apparatus utilizing luminous gaseous discharge generated by high frequency energy the tuning to optimum operating conditions may be carried out with greater precision using the split discharge method, than when using the conventional "balancing of loads" method.

If the antennas 12, 20 and 34 are provided with inductor coils I of 453 turns each, of No. 28 D.C.C. copper wire of 1¼-inch diameter, and also in each case an additional 10-foot length of antenna wire, the transfer efficiency when using a frequency of 2.2 mc.—approximately 137 meters— will be 32% to 33%. Fig. 1a shows an antenna 12 having an inductor I in circuit therewith.

This increase in transfer efficiency, that is, the transfer of electrical energy from the generator circuit to the reactor, is accomplished by turning each antenna by means of a variable inductance, the amount of the inductance being such as to preferably give what may be termed a "fat" discharge, that is, a discharge which is not a stringy arc—mostly core. For example, the arc between the electrode tips 24 and 10 is maintained in a bulged-out state, such as shown in Fig. 1, this being accomplished by cutting in or out in the antenna 12 inductance coils, a variable inductor being used to accomplish the same. If too many or too little coils are cut in or out of the antenna, then the discharge may become what is known as a "stringy" or a "fluttering" discharge; and, under some circumstances, may be entirely extinguished.

It is to be understood from the above explanation that no hard and fast rule can be given for the amount of inductance which is cut in or out of the antenna, but that functionally it should be that amount which will provide a fat discharge, or a fairly fat discharge, while at the same time producing a significant increase in electrical transfer efficiency, which may be as much as 80% to 85%.

It is desired to point out that the use of 453 turns of inductance coils, as described above, is necessary when using a high frequency current having a wave length of approximately 137 meters or approximately 2.2 mc. As the frequency of the electrical energy varies, the amount of inductance used must vary correspondingly.

While the conditions under which a fat discharge is produced between electrode tips 24 and 10 have been specifically set forth, similar conditions apply for the production of a fat discharge between the electrode tip 24 and electrode tip 33; and electrode tip 24 and electrode tip 15, fat discharges between said electrodes being generated by the insertion of inductances in the antennas 34 and 20 respectively. In this connection, it may be stated that all three antennas 12, 34 and 20 preferably should be adjusted simultaneously to insure maximum energy transfer efficiency.

It is desired to point out that equal amounts of inductance are placed in antennas 12, 34 and 20 respectively, since the discharge gaps between the hot electrode and the antenna electrodes are approximately equal. When these discharge gaps are not equal, then, of course, the inductances inserted in the respective antennas will not be the same.

As shown in Fig. 1, there is provided a hot electrode 24 and three antenna electrodes. However, the present invention is not limited to splitting the potential discharge into three distinct discharges. In other words, using the principle of the present invention, the potential discharge may be split into two discharges, three discharges, or a greater number of discharges, by increasing the number of antenna electrodes; and there will be produced, by employing said method and said apparatus, an increase of the character above set forth in the transfer efficiency of electrical energy, thereby insuring a paramount reduction in power costs for any given project.

While the present invention has been set forth in connection with the production of nitric oxide, it may be applied to effect in a number of chemical reactions, including chemical combination, polymerization, dehydrogenation, oxidation, and the like. Organic compounds, such as aliphatic, aromatic, or cyclic hydrocarbons, aldehydes, ketones, alcohols, esters, and acids, as well as nitrogen, sulphur, halogen, or other substitution products and derivatives thereof, may be treated in accordance with the principle of the present invention to effect chemical combination, splitting or breaking down, transformation from saturated to unsaturated compounds, or vice versa, hydrogenation, dehydrogenation, and many other chemical reactions.

The present invention may be used for the production of aldehydes, such as formaldehyde, for the oxidation of sulphur dioxide to sulphur trioxide, for the condensation of ammonia to hydrazine, the oxidation of benzene to phenol, and the like.

While it has been stated that the electrode terminals or tips are made of nickel, it is within the province of the present invention to employ other electrode materials, such as copper, brass, tantalum, silver, iron, chromium, nickel chromium alloys, nickel alloys, platinum alloys, and the like. Carbon electrodes may be used when an oxidizing atmosphere is not present. Any or all of the electrode terminals may be made of a copper lithium alloy, as, for example, 98% copper with 2% lithium. It is desirable that the hot electrode tip 24 consist of a higher melting metal or metal alloy, as, for example, tantalum, since the hot electrode carries the power which is supplied to the antenna electrodes, and therefore the hot electrode is always at a higher temperature and subject to more oxidation than the antenna electrodes.

The hot electrode terminal may be made of a metal or alloy having a different ion emission potential from the antenna electrodes. It is within the province of the present invention to make the electrodes and electrode tips of different conducting metals or alloys, so as to provide electrode tips each chosen to have its own selective ion emission potential.

While it has been stated that the reaction in the reactor 1 is carried out in a partial vacuum, it is within the province of the present invention to carry out reactions therein using atmospheric pressure or superatmospheric pressure.

Fig. 3 sets forth the hook-up of the high frequency generator unit used for producing the high frequency energy supplied to the tank circuit connecting the generator to the reactor. The diagram may be divided into four circuits, 38, 39, 40 and 41. Circuit 38 is the full wave rectification unit wherein the leads 42 connect to the 110-volt 60-cycle supply on the panel board. The numeral 43 identifies a transformer delivering its secondary high voltage current to the two rectification tubes 44, the filaments of which are heated by current generated in the filament transformer 45. The resistor 47 and fixed condenser 48, together with the choke coil 46, constitute a filter. The high voltage D. C. current produced by this circuit leaves same by means of the ground connection 49 and the lead 50, which delivers to the plate of tubes 51 and 52 of the oscillator circuit. The transformer 53, connected with 110-volt supply, provides the filament power for the tubes 51 and 52. The desired frequency is obtained by means of tuning the oscillator circuit 39, such tuning being effected by operation of the variable condenser 54 and the inductance 55.

In carrying out the work described as above set forth between the limits of wave length of 20 meters or 15 mc., and 175 meters or 1.71 mc., it is necessary to change the size of the inductance 55 by steps. This is done by removing one inductance and replacing same with another inductance having the desired characteristics. The minor circuit 56 is a coupling circuit, coupling the oscillator circuit 39 to the grid input circuit 57 of the power amplifier circuit 40. The grid circuit of the power amplifier is tuned by means of the variable condenser 58 and by changing inductance coils 57 in a manner similar to the change effected in inductance 55, as necessary to meet requirements. The combination of resistor 59 and condenser 60, both of which are grounded, serves to minimize or eliminate parasitic oscillations that might render the output less monochromatic. The resistor 61 provides grid bias for the power amplifier tubes 62 and 63. Transformer 64 provides power for the filaments of the power tubes 62 and 63. These tubes amplify power provided by circuit 41, imparting thereto the frequency developed by oscillator tubes 51 and 52. Transformer 65, connected with a 110-volt supply, provides the energy to the power supply rectification tubes 66 and 67. Transformer 68, also connected with a 110-volt supply, provides the power for the filaments of tubes 66 and 67. It will be observed that circuit 41 is essentially similar to circuit 38. The combination of the choke 69, fixed condenser 70, and resistor 71 constitutes a filter. The rectified power leaves the circuit via the milliammeter 72 to ground and lead 73 to the power amplifier circuit 40. The voltage at which it is delivered is measured by the voltmeter 74.

The power amplifier circuit 40 is tuned to the desired frequency as generated by means of oscillator tubes 51 and 52 of oscillator circuit 39 by means of the variable condenser 75 and the inductance 76. The inductance 76 is varied by means of changing coils to meet various wave length requirements as is done in the case of inductances 55 and 57. The power amplifier circuit 40 thus tuned and supplied by D. C. power from circuit 41 transmits the amplified high frequency energy to the coupling circuit 77, which in turn delivers it to a tank circuit such as is shown in Fig. 4 at 78.

Fig. 4 represents a tank circuit of the type known as "end grounded." The coupling circuit 78, Fig. 4, is part of the same circuit 77 shown in Fig. 3. It is placed at the end of the inductance 79 instead of in the middle, as would be the case if it were center grounded. The point 80 is the location of the hot electrode of the arc, while 12, 20 and 34 show the location of the antenna electrodes. Tuning of this tank circuit is accomplished by means of the variable condenser 81 and by changing the inductance 79 to meet requirements. The circuit conductors 82 are preferably of copper tubing. The high frequency voltmeter is shown at 83, and it will be noted that it has a ground terminal 84 which is also the ground terminal for the inductor 79. The hot electrode 80 connects into the tank circuit by means of conductor 26. This tank circuit was used in carrying out the invention as set forth in Figures 1 and 1a of the drawing, Figure 1 setting forth that form of the invention in which the wires themselves have sufficient inductance to effect tuning, and Figure 1a setting forth that form in which the antenna has an inductance in circuit therewith.

The present invention, while specifically adapted for the production of nitric oxide, may be used for the electrochemical transformation of many different chemical entities. Nitric oxide may be produced by passing through the reactor a nitrogen- and oxygen-containing medium in which the nitrogen and oxygen gases are present in various proportions, and includes air, which is a naturally-occurring mixture of oxygen and nitrogen gases, or a synthetic mixture containing nitrogen gas and oxygen gas. Each of said mixtures may have present a diluent gas, some of which assists in promoting the reaction so as to produce nitrogen oxides, as, for example, nitric oxide, said diluent gas preferably being an inert gas, as, for example, helium, neon, and the like.

By "radio frequency" as used above is meant a frequency ranging from 300,000 cycles to 600 mc. and more usually 500,000 cycles to 60 mc.

By "radar frequency" as used above is meant a frequency ranging from 30 mc. to 30,000 mc. and more usually a frequency from 60 mc. to 3,000 mc.

What is claimed is:

1. In an electrochemical apparatus for effecting electrochemical transformation of gaseous material, the combination of a reactor chamber, means for introducing gaseous material therein, means for removing transformed material therefrom, an electrical circuit furnishing cyclic electrical energy, a high potential electrode in said reactor chamber and connected in said circuit and receiving said cyclic electrical energy, a plurality of cooperating low potential electrodes disposed in said reactor chamber, said cooperating low potential electrodes being separately spaced from each other and arranged to receive a luminous discharge from said high potential electrode, an antenna connected to each of said separately spaced cooperating electrodes, the latter and each antenna being in circuit with said source of cyclic electrical energy, and means to tune each antenna and thereby initiate and maintain a plurality of discharges between said high potential electrode and the low potential electrodes.

2. In an electrochemical apparatus for effecting electrochemical transformation of gaseous material, the combination of a reactor chamber, means for introducing gaseous material therein, means for removing transformed material therefrom, an electrical circuit furnishing cyclic electrical energy, a high potential electrode in said reactor chamber and connected in said circuit and receiving said cyclic electrical energy, a plurality of cooperating low potential electrodes disposed in said reactor chamber, said cooperating electrodes being separately spaced from each other and arranged to receive a luminous discharge from said high potential electrode, an antenna connected to each of said separately spaced cooperating low potential electrodes, the latter and each antenna being in circuit with said source of cyclic electrical energy, and an inductance in said circuit sufficient to tune each antenna and thereby initiate and maintain a plurality of discharges between said high potential electrode and said cooperating low potential electrodes.

3. In an electrochemical apparatus for effecting electrochemical transformation of gaseous material, the combination of a reactor provided with means for introducing gaseous material therein, means for removing transformed material therefrom, and an electrical circuit furnishing cyclic electrical energy, a high potential electrode in said reactor and connected in said circuit and receiving said cyclic electrical energy, a plurality of cooperating low potential electrodes disposed in said reactor, said electrodes being separately spaced from each other and arranged to receive a luminous discharge from said high potential electrode, and an antenna wire connected to each of said separately spaced cooperating electrodes, the latter and each antenna wire being in circuit with said source of cyclic electrical energy, each of said antenna wires having of itself sufficient inductance to be correctly tuned and thereby initiate and maintain a plurality of discharges between said high potential electrode and said cooperating low potential electrodes.

4. In combination, an electrical circuit including therein a source of cyclic electrical energy capable of producing a frequency of at least 10,000 cycles per second, a reactor chamber, means for introducing gaseous material therein, means for removing transformed material therefrom, a high potential electrode in said reactor chamber, and in circuit with said source of cyclic energy, a plurality of cooperating low potential electrodes separately spaced from each other and arranged to receive a luminous discharge from said high potential electrode, an antenna connected to each of said separately spaced low potential electrodes and in circuit with said source of cyclic energy, and means to tune each antenna and thereby initiate and maintain a plurality of discharges between said high potential electrode and said low potential cooperating electrodes.

5. In an electrochemical apparatus for effecting electrochemical transformation of gaseous material, the combination of a reactor chamber, means for introducing gaseous material therein, means for removing transformed material therefrom, an electrical circuit furnishing cyclic electrical energy varying between .5 mc. and 60 mc., a high potential electrode in said chamber connected in said circuit and receiving said cyclic electrical energy, a plurality of low potential cooperating electrodes disposed in said reactor chamber, said cooperating low potential electrodes being separately spaced from each other and arranged to receive a luminous discharge from said high potential electrode, an antenna connected to each of said separately spaced cooperating electrodes, the latter and each antenna being in circuit with said source of electrical energy, and means to tune each antenna and thereby initiate and maintain a plurality of electrical discharges between said high potential electrode and the cooperating low potential electrodes.

EARL T. DENTON.

REFERENCES CITED

The following references are of record in the file of this patent:

UNITED STATES PATENTS

| Number | Name | Date |
|---|---|---|
| 507,975 | De Neal | Oct. 31, 1893 |
| 672,231 | Lacomme | Apr. 16, 1901 |
| 739,920 | Pauling | Sept. 29, 1903 |
| 926,413 | Helbig | June 29, 1909 |
| 1,368,014 | Buettner | Feb. 8, 1921 |
| 1,912,373 | Jakosky et al. | June 6, 1933 |
| 2,106,780 | Whittier | Feb. 1, 1938 |

FOREIGN PATENTS

| Number | Country | Date |
|---|---|---|
| 354,736 | Great Britain | Aug. 6, 1931 |
| 34,017 | Austria | Aug. 10, 1908 |
| 297,773 | Germany | Dec. 23, 1915 |

OTHER REFERENCES

Comptes Rendus de l'Academie des Sciences de l'U. R. S. S., vol. 18, (1938), page 329.